United States Patent

[11] 3,613,063

| [72] | Inventor | Michael F. Ciemochowski<br>Warren, Mich. |
|---|---|---|
| [21] | Appl. No. | 761,557 |
| [22] | Filed | Sept. 23, 1968 |
| [45] | Patented | Oct. 12, 1971 |
| [73] | Assignee | Holley Carburetor Company<br>Warren, Mich. |

[54] SNOW DETECTING DEVICE
11 Claims, 6 Drawing Figs.

| [52] | U.S. Cl. | 340/234 |
|---|---|---|
| [51] | Int. Cl. | G08b 21/00 |
| [50] | Field of Search | 340/234 |

[56] References Cited
UNITED STATES PATENTS

| 3,164,820 | 1/1965 | Hulett | 340/234 |
|---|---|---|---|
| 3,428,890 | 2/1969 | Peck et al. | 340/234 |

Primary Examiner—Robert L. Griffin
Assistant Examiner—Barry Leibowitz
Attorney—Walter Potoroka, Sr.

ABSTRACT: A device for detecting the formation and presence of frost, ice or snow on a surface employs signal-producing sensing means to sense the temperature of the surface, as well as the presence of either free water, frost, ice or snow. The signals produced in response thereto are compared to certain established reference values indicative of freezing temperature as well as relative electrical conductivity of free water, frost, ice or snow in order to logically determine whether it is merely free water which is being sensed or if it is actually frost, ice or snow and in accordance with such determination create an appropriate output response.

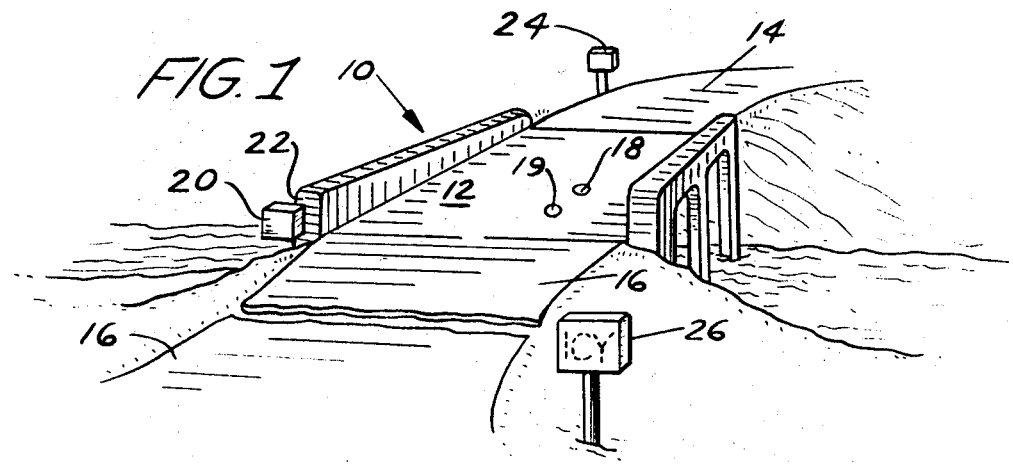
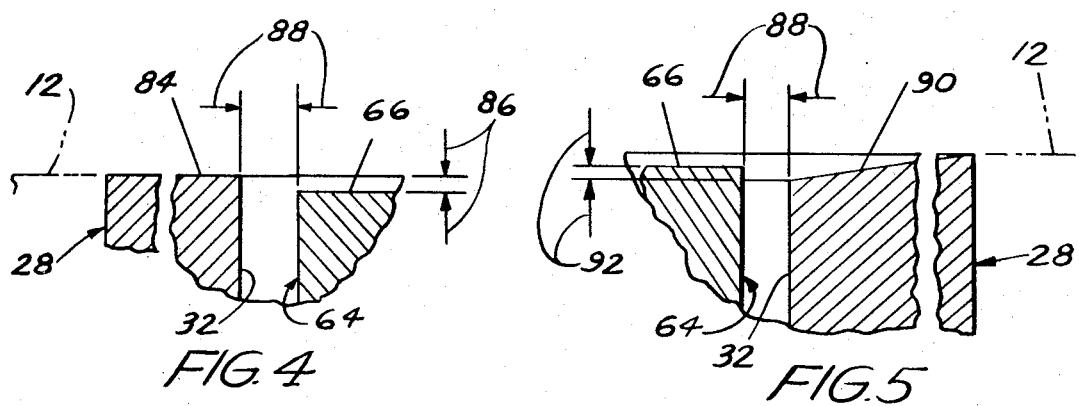
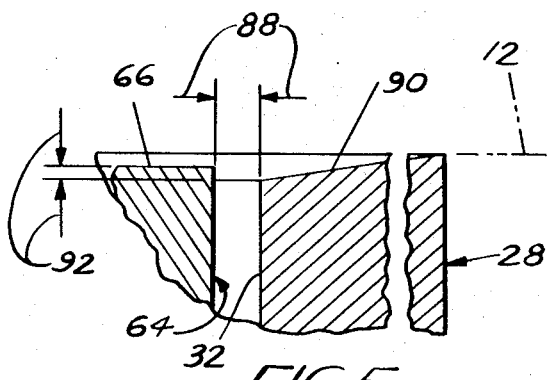
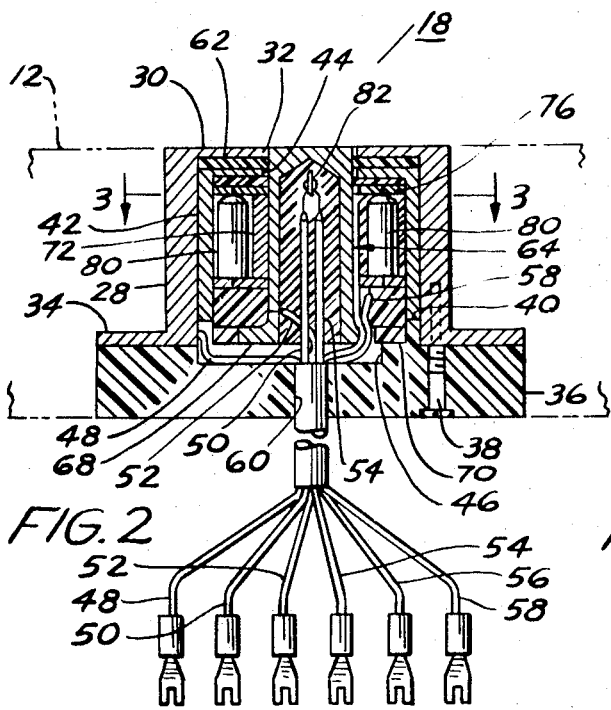
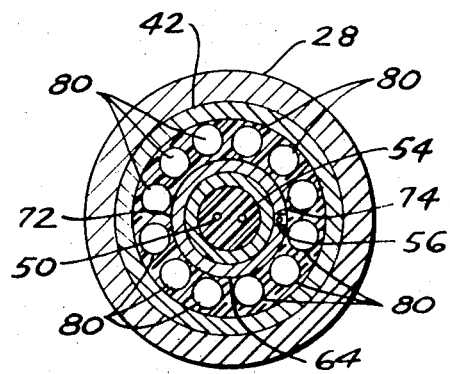
MICHAEL F. CIEMOCHOWSKI
INVENTOR.
BY Walter Potsroka
ATTORNEY

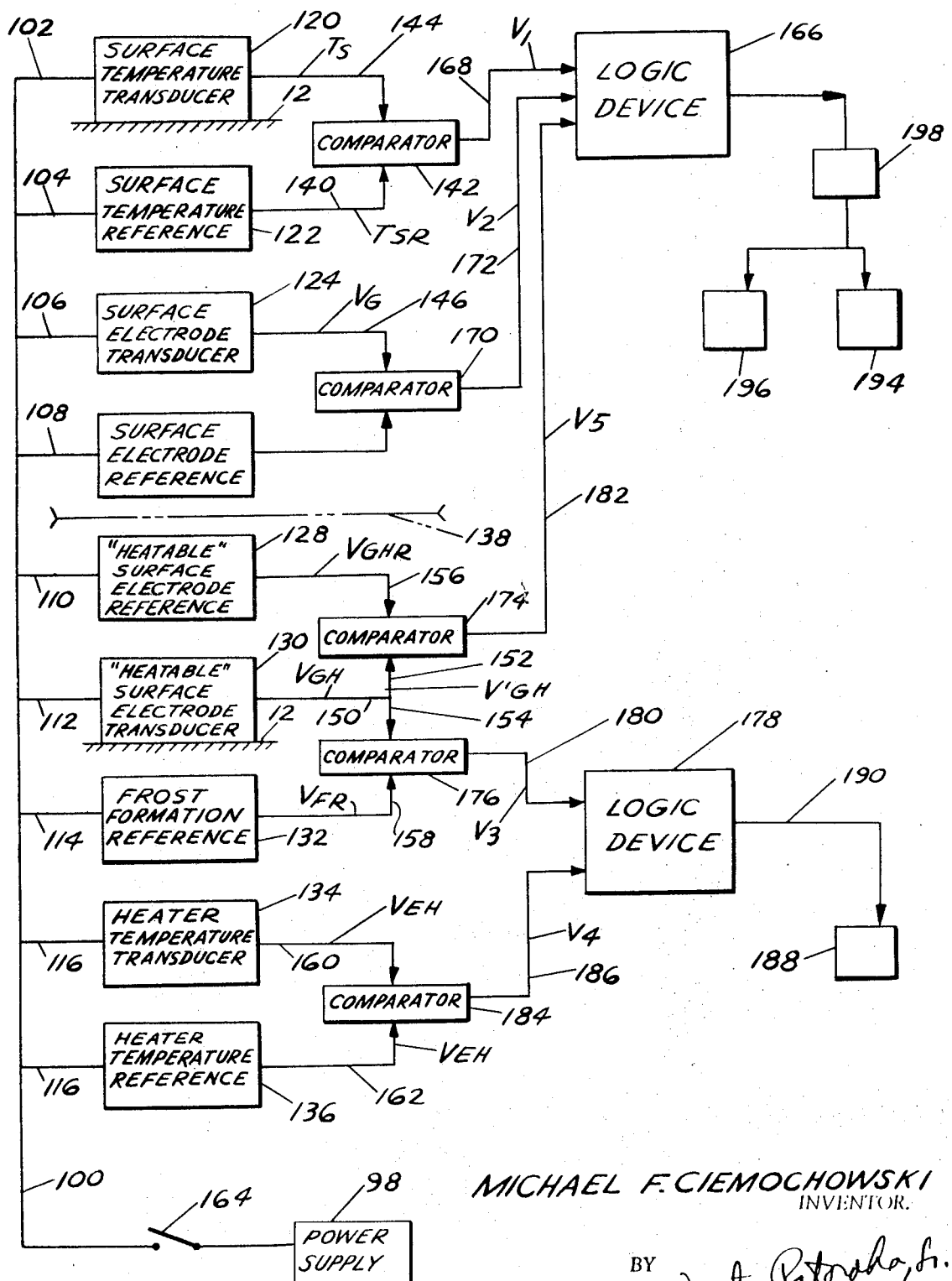

SNOW DETECTING DEVICE

BACKGROUND OF THE INVENTION

This invention relates generally to atmospheric condition indicating devices and more particularly to an electrical device for detecting the presence of frost, ice or snow on a selected surface.

In many instances it is desirable to detect situations of frost, ice or snow formation on selected surfaces where such formations may result in dangerous conditions. Some examples of such are the formation of frost or ice on airport runways and on bridge roadway surfaces.

Various devices have been proposed by the prior art; however, such devices have proven to be unsatisfactory for one or more of the following reasons. Many of the prior art structures are of the anticipatory type. That is, they are not able to detect the substantially precise moment of, for example, frost formation on the monitored surface and must instead rely on such parameters of humidity, atmospheric temperature and dew point in order to compute if such parameters indicate frost to be imminent. However, because of variations in combinations of such parameters which will result in frost formation plus the variations in performance characteristics of the device itself, such devices are purposely calibrated so that they actually indicate the existence of, for example, frost or ice formation when no such frost or ice in fact exists. That is, the device is in its anticipating stage.

It can be appreciated that if such prior art devices were employed on a series of bridges and the motorists saw some advanced warning, as they approached the respective bridges, that each of the bridges was icy and upon driving onto the bridge finding it in fact not icy, the motorists would quickly lose all future reliance on such advance warning systems.

Other prior art devices rely strictly on the sensing of atmospheric conditions. Such systems and devices overlook situations where, for example, it may be raining at one area along a roadway and yet the rain might be freezing at some area along the roadway as, for example, a viaduct, bridge or some other area where because elevations, wind patterns and other factors wide variations in or rapid changes of temperature may occur. As an example, bridges will experience frost or ice formations quicker than the roadway leading to and from the bridge because the bridge is more nearly exposed to the atmosphere than is the earth-sheltered roadway, thereby resulting in quicker cooling of the roadway surface on the bridge. Therefore, the bridge surface is likely to attain dew point and freezing conditions while the highway leading to the bridge is experiencing only rain or free water. Accordingly, such prior art systems which rely merely on sensing atmospheric conditions do not have the ability to distinguish as between the atmosphere and what is actually happening on a selected surface, such as the bridge road surface, in order to give advance warning.

Still other systems would remain energized continuing to give warning of icy conditions even though the surface was salted and the frost, ice or snow, previously formed thereon, melted to free water. This, of course, would have the same effect on motorists as would a prolonged anticipatory signal as previously discussed.

SUMMARY OF THE INVENTION

According to the invention, a device for detecting the presence of an atmospheric formation on a surface comprises first means for creating a first output signal indicating that said surface has attained a first predetermined temperature, second means effective for creating a second output signal indicative of the presence of said formation on said surface, third means effective for determining if said formation is merely free water or if said formation consists of frost, snow or ice and creating in accordance therewith a third output signal, and fourth means adapted to receive said output signals, said fourth means being effective upon simultaneously receiving said first, second and third output signals for causing actuation of related output means.

Accordingly, a general object of this invention is to provide a device for detecting the presence of a formation of frost, snow or ice at the time of occurrence of said formation and create appropriate action, in response thereto, in related warning or control devices.

Another object of this invention is to provide a device which will detect the presence of a formation of frost, snow or ice at the time of occurrence of such formation and after creating an appropriate action, in response thereto, in a related warning device to terminate such action in said warning device upon the elimination of such frost, snow or ice even though atmospheric conditions may indicate possible freezing or icing conditions.

Other more specific objects and advantages of the invention will become apparent when reference is made to the following detailed description considered in conjunction with the accompanying drawings wherein certain details may be omitted from one or more views for purposes of clarity.

DESCRIPTION OF THE DRAWINGS

In the drawings:

FIG. 1 is perspective view of a bridge having a road surface formed thereon and provided with a detecting device constructed in accordance with the teachings of this invention;

FIG. 2 is an axial cross-sectional view of a typical parameter sensing assembly employed in the invention;

FIG. 3 is a cross-sectional view taken generally on the plane of line 3–3 of FIG. 2 and looking in the direction of the arrows;

FIG. 4 is an enlarged cross-sectional view of a fragmentary portion of the assembly of FIG. 2;

FIG. 5, a view similar to FIG. 4, illustrates a modified form thereof; and

FIG. 6 is a schematic representation of apparatus embodying the invention.

DESCRIPTION OF PREFERRED EMBODIMENTS

Referring now in greater detail to the drawings, FIG. 1 illustrates a highway bridge 10 having a roadway 12 formed thereon which, at respective ends, joins highway portions 14 and 16. A plurality of sensor assemblies 18 and 19 are suitably imbedded within the bridge roadway 12 and connected through suitable electrical circuitry to a control panel, which may be housed as within a box 20 mounted on a structural portion 22 of the bridge 10, and suitable sensory warning devices such as electrically energized signs 24 and 26 located along the highway portions 14 and 16 approaching the bridge from opposite directions.

As will become evident, the preferred form of the invention employs sensor assemblies 18 and 19 which are structurally equivalent to each other. However, for both clarity and ease of description, the sensor assemblies are identified by different reference numbers. Nevertheless, for purposes of disclosure, it may be assumed that each of the sensor assemblies is comprised as typically illustrated by the axial cross-sectional view of FIG. 2 and the corresponding transverse cross-sectional view of FIG. 3.

Referring to FIG. 2, sensor assembly 18 is illustrated as being comprised of an outer cuplike housing 28 provided with an end portion 30 having an aperture 32 formed therethrough and a radiating flange 34 formed at the other end by which the housing 28 may be secured in abutting relationship to the electrically nonconductive base 36 as by suitable screws, one of which is shown at 38.

Base 36 has formed thereon a circular ridge portion 40 which supports an inner cuplike housing 42 having an aperture 44 formed in the upper end thereof. A slot 46, formed in the upper surface of base 36 generally within the confines of ridge 40 is provided for the passage therethrough of conductors 48, 50, 52, 54, 56 and 58 which may be grouped into a cablelike bundle in order to pass through base aperture 60.

An electrically nonconductive washerlike member 62 contained generally between the ends of outer and inner housings 28 and 42 is provided with a centrally formed aperture which closely receives therethrough the thermistor housing or inner electrode 64. Spacer or washer 62 also serves as a radial thrust support functioning to assure the maintaining of thermistor housing 64 centrally disposed within aperture 32 so that no contact is experienced between the outer surface of thermistor housing 64 and the surface of either aperture 32 or aperture 44.

Thermistor housing 64, which as will become evident also acts as an inner electrode, is of generally cylindrical tubular construction having a closed end defining an upper surface 66 and a radiating flange 68 formed at the other end so as to operatively abut against the upper surface 70 within the ridge 40 of base 36. Suitable slotted portions, as illustrated, may be formed in the flange 68 in order to permit the passage therethrough of conductors 48, 56 and 58.

A tubular spacer 72, having an axial slit 74 formed therethrough as to accommodate the passage of conductor 56, situated about the thermistor housing 64 serves as an axial spacer for oppositely disposed cooperating printed circuit boards 76 and 78. Each of the boards 76 and 78 is provided with apertures formed therein to receive individual electrical leads from a plurality of resistors 80 situated between the printed circuit boards and circumferentially about the thermistor housing 64. The printed circuits on each of the boards 76 and 78 are such as to place the plurality of resistors 80 in parallel with respect to each other and, as a group, in series with conductors 56 and 58 which are also suitably respectively connected to the printed circuits of boards 76 and 78.

A thermistor 82, shown as being a disc of semiconductor material having catwhisker leads respectively electrically connected to conductors 50 and 54, is situated within said thermistor housing 64 generally centrally thereof. The thermistor 82, as well known in the art, changes its electrical resistivity in accordance with the temperature sensed thereby.

The various cavities surrounding the resistors 80, the space at opposite sides of printed circuit boards 76 and 78 and the space within thermistor housing 64 are preferably filled with nylon which may be introduced therein in liquid form when the inner housing 42, thermistor housing 64, printed circuit boards 76, 78, resistors 80 and associated electrical conductors are first combined into a subassembly.

As can be seen from FIG. 2, one end conductor 48 is electrically connected to outer housing or electrode 28, one end of conductor 52 is electrically connected to thermistor housing or inner electrode 64 and one end of conductor 56 and conductor 58 are respectively connected to printed circuit boards 76, 78 while, as previously stated, conductors 50 and 54 have their respective one ends electrically connected to thermistor 82. The respective other ends of conductors 48, 50, 52, 54, 56 and 58 are suitably electrically connected, in accordance with the teachings of this invention, to the control panel within panel housing 20.

FIG. 4, an enlarged cross-sectional view of a fragmentary portion of the sensor assembly 18 of FIG. 2, illustrates in greater detail the preferred configuration of certain of the elements typically comprising the sensor assembly. In the preferred form, upper surface 66 of inner electrode or thermistor housing 64 is made so as to be 0.002 inches to 0.005 inches below the plane of upper end surface 84 of the outer housing or electrode 28. This is pictorially represented as the distance between opposed arrows 86. Further, in the preferred form, the radial gap between the outer cylindrical surface of inner electrode 64 and the surface of orifice 32 is made to be in the order of 0.005 inches to 0.030 inches. This is pictorially represented as the distance between opposed arrows 88.

FIG. 5, a view similar to that of FIG. 4, illustrates a modification thereof. It will be noted that in FIG. 5, the upper end of outer housing or electrode 28 is provided with a somewhat dished or concave surface 90 and that the upper surface 66 of inner electrode 64 is at some distance, pictorially represented by the opposed arrows 92, above the lowest point of dished surface 90 but below the highest point of the same dished surface 90. Again, the preferred radial gap is illustrated by the opposed arrows 88.

Before progressing to FIG. 6, it should be mentioned that the invention as herein disclosed contemplates the employment of two sensor assemblies as typically illustrated in FIG. 2. However, as will become evident in the normal course of operation one of the sensors does not have its resistors 80 energized at any time; such sensor will be referred to as an "unheated" and identified as sensor 19 while the sensor 18 will, at certain times of operation, have its resistors 80 energized in order to create a heating effect; accordingly, sensor 18 will be referred to as either a "heated" or "heatable" sensor.

In FIG. 6, a schematic representation of apparatus embodying the invention, a suitable source of electrical energy 98, preferably regulated, supplies electrical power as by a main conductor 100 to branch conductor means 102, 104, 106, 108, 110, 112, 114, 116 and 118 respectively leading to a surface temperature transducer 120, a surface temperature reference device 122, a surface electrode transducer 124, a surface electrode reference device 126, a heatable surface electrode reference device 128, a heatable surface electrode transducer 130, a frost formation reference device 132, a heater temperature transducer 134 and a heater temperature reference device 136. Generally, all of the elements 120, 122, 124 and 126 illustrated above the horizontal division line 138 may be considered as being associated with the unheated sensor assembly 19 while those elements 128, 130, 132, 134 and 136 illustrated below the division line 138 may be considered as being associated with the heated or heatable sensor assembly 18.

Further defining the apparatus of FIG. 6, the thermistor 82 of unheated sensor 19 comprises surface temperature transducer 120, while the gap 88 between inner electrode 64 and outer electrode 28 of unheated sensor 19 comprises the surface electrode transducer 124. The surface temperature reference device 122 and the surface electrode reference device are each comprised of a variably set potentiometer.

The gap 88 between inner electrode 64 and outer electrode 28 of heated or heatable sensor 18 comprises the "heatable" surface electrode transducer 130, while the thermistor 82 of sensor assembly 18 comprises the heater temperature transducer 134. The "heatable" surface electrode reference device 128, the frost formation reference device 132 and the heater temperature reference device 136 are each comprised of a variably set potentiometer as are well known in the art.

Further discussion of the apparatus of FIG. 6 will best be understood if, as follows, combined with certain exemplary assumed conditions and related mode of operation.

It should of course be remembered that the invention is intended to both anticipate and detect the formation of either frost, ice or snow on the surface 12 and institute appropriate action in accordance therewith. Therefore, the entire apparatus may be considered as one which measures certain variable parameters and compares such measurements against established known quantities or reference values in order to logically determine whether such variable parameters individually meet the conditions for the formation or presence of frost, ice or snow. Generally speaking, whenever the temperature of surface 12 is equal to dew point frost will start to form on the surface 12.

Accordingly, let it be assumed that:

1. the surface temperature reference potentiometer 122 has been adjusted and set as to create a voltage output signal, $T_{SR}$, on conductor 140, of a value indicative of the temperature at which it is desired that the comparator 142 produce a signal as, for example, 32° F.;

2. the surface temperature transducer or thermistor 120 continually senses the temperature of surface 12 and creates in accordance therewith a variable voltage output signal, $T_S$, on conductor 144;

3. the resistance value of the gap 88 or surface electrode transducer 124 is normally infinitely large but that when ice or frost bridges the gap 88 so as to complete a circuit between electrodes 28 and 64, a voltage output signal, $V_G$ of predetermined magnitude indicative of the existence of ice across the gap 88 or some resistance higher than that presented by the existence of water thereacross, is created on conductor 146;

4. the surface electrode reference potentiometer 126 has been adjusted and set as to create a voltage output signal, $V_{GR}$, on conductor 148 which is equal in magnitude to the value of voltage output signal, $V_G$, when such signal, $V_G$, exists;

5. the resistance value of the gap 88 or "heatable" surface electrode transducer 130 is normally infinitely high but that when:

a. frost forms to bridge the gap 88 so as to complete a circuit between electrodes 28 and 64 (sensor assembly 18), a voltage output signal, $V_{GH}$, is created on conductor 150 (for purposes of illustration the value of signal $V_{GH}$ will be assumed to be 9.5 volts when frost is bridging the gap 88);

b. water is present and bridges the same gap 88 a voltage output signal, $V'_{GH}$, is created on conductor 150 (for purposes of illustration the value of signal $V'_{GH}$ will be assumed to be 2.0 volts); from FIG. 6, it can be seen that whichever signal, $V_{GH}$ or is impressed on conductor 150 that the same signal will also be impressed on parallel branch conductors 152 and 154.

6. the "heatable" surface electrode reference potentiometer 128 has been adjusted and set as to create an output voltage signal, $V_{GHR}$, on conductor 156, the value of which is assumed to be 2.0 volts;

7. the frost formation reference potentiometer 132 is adjusted and set as to create an output voltage signal, $V_{FR}$, on conductor 158, the value of which is assumed to be 9.5 volts;

8. the heater temperature transducer 134 (thermistor 82 in sensor assembly 18) continually senses the temperature of the electrode 64 and creates, in accordance therewith, a variable output voltage signal, $V_{EH}$, on conductor 160; and 9. the heater temperature reference potentiometer 136 has been adjusted and set as to create an output voltage signal, $V_{EHR}$, on conductor 162 the magnitude of which is such as to, for example, be indicative of a temperature of 38.0° F.

Since both sensor assemblies 18 and 19 are imbedded within the roadway surface 12, both will be at the same temperature as is the surface 12. Therefore, it follows that outer and inner electrodes 28 and 64 of each sensor assembly will also be at the same temperature.

OPERATION

Let it now be assumed that the invention as shown by FIG. 6 is made operational, as by the closure of switch 164, and that the temperature of surface 12 is at some value above freezing but that it is steadily decreasing.

At this time the surface temperature reference potentiometer 122 is producing the voltage signal $T_{SR}$ indicative of 32° F. and applying this signal to comparator 142. As the temperature of surface 12 decreases, the value of output voltage signal $T_S$ produced by the surface temperature transducer 120 continually changes in accordance with the temperature until such time as the temperature of surface 12 reaches 32° F. At this time the value of output voltage signal $T_S$ equals reference voltage signal $T_{SR}$ which equality is sensed by comparator 142. Comparator 142, in turn, causes a voltage signal $V_1$ to be impressed on the logic device 166 via conductor 168. The production of the signal $V_1$ indicates that one of the conditions established for the formation of frost has occurred and said signal $V_1$ will continue to exist even though the temperature sensed by transducer 120 decreases to below that reference value established by reference potentiometer 120.

During this time, of course, the surface electrode reference potentiometer is producing the reference voltage signal $V_{GR}$ on conductor 148 and applying it to a second comparator 170. At this time no proper signal is produced by comparator 170. As previously mentioned, the surface electrode transducer 124 is, in fact, the gap created by inner electrode 64 and outer electrode 28 of unheated sensor assembly 19. This was previously described as having an infinite resistance; however, as frost or ice starts to form bridging the gap 88 the surface electrode transducer 124 will produce the output voltage signal $V_G$ and apply it to comparator 170. Since, as again previously stated, the voltage values of signals $V_G$ and $V_{GR}$ are equal, comparator 170 will cause a second output signal $V_2$ to be applied to logic device 166 as by conductor means 172. This now indicates to the logic device 166 that something other than water, in this case frost, exists across the gap of electrodes 64 and 28.

The next consideration is the related operation of the "heatable" sensor assembly 18 as generally depicted below the line 138. The "heatable" surface electrode reference potentiometer 128 is producing a voltage signal $V_{GHR}$ which, according to the assumed conditions, is equivalent to a voltage of 2.0 volts. The value of 2.0 volts is indicative of that voltage across gap 88 of sensor assembly 18 produced when water exists thereacross. Output signal $V_{GHR}$ is applied to comparator 174 as by conductor means 156.

The frost formation reference potentiometer 132 produces a reference voltage signal $V_{FR}$ on conductor 158 and applies it to comparator 176. The value of voltage signal $V_{FR}$ is assumed to be 9.5 volts which is determined to be the voltage which will exist across the gap 88 of inner and outer electrodes 64 and 28 of sensor 18 when frost has formed and bridged the gap.

Since the inner and outer electrodes 64 and 28 of the "heatable" sensor assembly are also at the same temperature as surface 12, frost will form to bridge the gap 88 thereby causing the "heatable" surface electrode transducer 130 to create the output voltage signal $V_{GH}$ and apply it, by means of conductor means 150 and 154 to comparator 176. The values of signals $V_{GH}$ and $V_{FR}$ are equal to each other thereby causing comparator 176 to produce an output signal $V_3$ and apply it to logic device 178 as by conductor means 180.

The same signal $V_{GH}$ is also applied as by conductor means 152 to comparator 174; however, because the value of $V_{GH}$ far exceeds the value of signal $V_{GHR}$, comparator 174 does not produce any proper output signal on conductor means 182 leading to logic device 166.

The heater temperature reference potentiometer 136 produces a voltage signal $V_{EH}$, on conductor means 162, which is assumed to be reflective of a temperature of 38° F. However, the heater temperature transducer 134 (thermistor 82 of sensor assembly 18) being at the temperature of electrodes 28 and 64 which are, in turn, at the temperature of surface 12, produces a variable voltage signal $V_{EH}$ indicative of the electrode temperature. Since the conditions assumed include 32° F., the comparator 184 produces an output signal $V_4$ on conductor means 186 and applies to logic device 178. The logic device now having received both signals $V_4$ and $V_3$ causes energization of the heater section 188, as by conductor means 190, comprising the plurality of resistors 80 within the sensor assembly 18.

As a consequence of the energization of resistors 80 or heater 188, both the inner and outer electrodes 28 and 64 of sensor assembly 18 are both heated thereby to some predetermined temperature. That temperature, for purposes of illustration is assumed to be 38° F. Accordingly, in the process of becoming heated, the inner and outer electrodes 28 and 64 cause the frost which had formed to bridge the gap 88("heatable" surface electrode transducer 130) to melt thereby forming water between and contacting the inner and outer electrodes of sensor assembly 18. The presence of water in turn causes transducer 130 to produce the output voltage signal $V'_{GH}$ which is applied to comparator 174 via conductor means 150 and 152. For reasons previously established, signal $V'_{GH}$ equals reference signal $V_{GHR}$ causing comparator 174 to produce a signal $V_5$ on conductor means 182 thereby applying such signal to logic device 166.

Once logic device 166 senses the presence of all signals $V_1$, $V_2$ and $V_5$ conductor means 192 is energized causing, in turn, energization of sensory warning means 194 (which may comprise the electrically energizable signs 24 and 26 of FIG. 1) as well as additional remotely spaced means 196 which may be situated within, for example, a highway patrol station so as to advise those within the station to take appropriate action such as applying salt or sand to the highway surface. Of course, means 196 may well include suitable circuitry, depending on the type of surface being gauged, which will initiate, in and of itself appropriate corrective action. Such corrective action could include the energization of heaters which would be employed for heating the surface being monitored in order to eliminate therefrom such frost or icing conditions. If desired, time delay means 198 may be interposed with the conductor means 192 for purposes to be described.

The heater section 188 will remain energized until such time as the output signal, $V_{EH}$, of heater temperature transducer 134 (thermistor 82) indicates that the selected temperature (in this example assumed to be 38° F.) of the electrodes 28 and 64 has been attained. By this arrangement, it is possible to maintain the temperature of electrodes 28 and 64 relatively constant since the signal $V_3$ from comparator 176 continues to exist on logic device 178 even after the signal $V_{GH}$ has diminished to $V'_{GH}$.

Generally summarizing the preceding, it can be seen that a first signal $V_1$ was produced indicating that the parameter of temperature was at a condition conducive to freezing or frost formation. A second signal $V_2$ was produced indicating that "something" has formed on or bridged the gap 88 of surface electrode transducer 124. Next, the same "something" which bridged the gap 88 of transducer 124 also forms on and is sensed by the "heatable" surface electrode transducer 130 which produces its corresponding signal. At this point, the system logically has not determined that the "something" is either frost, ice or snow and therefore causes the heater 188 to be energized to above freezing temperature to see if that "something" will melt to water. If it does melt, as set out in the above example, such as detected by the comparator 174 which produces the signal $V_5$ saying in effect that the "something" is actually frost, ice or snow since heat made it melt to water.

In view of the above it should be apparent that the absence of any one of the signals $V_1$, $V_2$, $V_3$, $V_4$ and $V_5$ will preclude the energization of the logic devices 166 and 178. The time delay means 198 may be employed, where desired, so as to, for example, maintain the sensory warning devices 24 and 26 (represented collectively at 194) energized for a predetermined length of time after the system of FIG. 6 otherwise indicates that the frost, ice or snow conditions have ceased to exist.

It should also be apparent that the invention herein described provides means whereby the warning devices such as 24 and 26 would become deenergized when the road surface 12 was salted because such salting would result in the formation of water within the gap 88 of sensor 19 causing the loss of signal $V_G$ and the loss of resultant signal $V_2$. This is contrary to many proposed prior art structures which continue to indicate the presence of hazardous road surface conditions even after such roadways have been salted.

Further, the invention provides means whereby, for example, the motor vehicle operator is forewarned of frost, ice or snow conditions only when such conditions are existing. That is, unlike many proposed prior art devices, the invention does not rely on atmospheric or humidity sensing means which indicate not only when ice or snow conditions exist but also usually anticipate the occurrence of such conditions. Accordingly, in such prior art devices, the motorist may be warned of icy conditions when in fact such conditions do not exist but are merely anticipated by the sensing device. After a few such experiences, the motorist tends to loose his reliance on the warning device and such loss of reliance may result in tragic consequences when such icy conditions do in fact exist.

Referring again to FIG. 4, it should be pointed out that in the preferred embodiment, the inner electrode 64 has its upper surface 66 below the plane of outer electrode end surface 84. This feature enhances the formation of frost and ice not only along the periphery of the surfaces defining gap 88 but also along the upper surface 66 itself thereby increasing the surface contact area of the frost as well as the water which may be derived from either rainfall or the melting of the frost, ice or snow as described herein in connection with the operation of the invention.

FIG. 5, illustrating a modified form of the structure of FIG. 4, provides a concave or dished end surface 90. Even though end surface 66 of electrode 64 is above the lowermost portion of outer electrode end surface 90, it can be seen that the formation of frost and the containment of water is enhanced by the fact that the uppermost portion of end surface 90 is at least as high or higher than end surface 66.

The invention has been disclosed as employing two sensor assemblies 18 and 19, each of which is constructed in accordance with the disclosure of FIGS. 2 and 3. It should be apparent that the system as disclosed by FIG. 6 could be practiced by employing other sensor assemblies, or portions thereof, in combination with electrical components well known in the art in the manner and mode of operation disclosed herein.

For example, any suitable transducers could be employed for elements 120, 124, 130 and 134 of FIG. 6 without the necessity of having the precise structure or assembly of the sensor assemblies 18 and 19. Further, the comparators 142, 170, 174, 176 and 184, sometimes referred to as electrical amplifiers, are well known in the art and therefore a detailed description of their construction and mode of operation is not considered to be necessary.

Even if sensor assemblies as disclosed by FIGS. 2 and 3 are employed in practicing the invention, it is not essential that both be identical. That is, for example, sensor assembly 19 may have omitted therefrom the heater section comprised of the plurality of resistors 80 since such resistors are not employed during the operation of the invention; however, it is of benefit to have both sensor assemblies provided with a heater section and related wiring circuitry so that in the event of a failure in the "heatable" sensor assembly the functions of the two sensor assemblies can be reversed resulting in the previously unheated sensor becoming the "heatable" sensor assembly.

Although basically only one embodiment has been disclosed and described it is apparent that other embodiments and modifications of the invention are possible within the scope of the appended claims.

What I claim as my invention is:

1. A device for detecting the presence of an atmospheric formation on a surface, comprising first means for creating a first output signal indicating that said surface has attained a first predetermined temperature, second means effective for creating a second output signal indicative of the presence of said formation on said surface, said second means being continuously unheated so as not to melt said formation if the same is frozen, third means effective for determining if said formation is merely free water or if said formation consists of frost, snow or ice and creating in accordance therewith a third output signal, said third means having heating means therefor, said heating means being initially deenergized but becoming energized in response to the presence of said formation on said third means so as to melt said formation on said third means, if the same is frozen, whereby said second and third output signals will be of different values, and fourth means adapted to receive said output signals for causing actuation of related output means.

2. A device according to claim 1 wherein said first means comprises first temperature sensing means adapted to sense the temperature of said surface and produce in accordance therewith a first parameter output signal, temperature reference means adapted to produce a first reference signal of a predetermined magnitude indicative of a predetermined temperature, and additional means for receiving said first parameter output signal and said first reference signal, said additional means being effective upon receiving said first parameter output signal and said first reference signal for determining if said temperature of said surface is equal to or less than said predetermined temperature.

3. A device according to claim 2 wherein said temperature reference means comprises an adjustable potentiometer, and wherein said additional means comprises an electronic comparator, said comparator being effective for producing said first output signal.

4. A device according to claim 1 wherein said second means comprises transducer means responsive to the presence of said formation and thereupon effective for creating a first parameter output signal, reference means for creating a reference signal of a predetermined magnitude, and additional means for receiving said first parameter output signal and said reference signal, said additional means being effective upon receiving said first parameter output signal and said reference signal for determining if said first parameter output signal is equal to or greater than said predetermined magnitude of said reference signal.

5. A device according to claim 4 wherein said transducer comprises spaced electrodes normally having an infinitely large electrical resistance between said electrodes and a plurality of finite electrical resistances between said electrodes depending on the electrical conductivity properties of said formation when said spaced electrodes experience a bridging of said formation across said spaced electrodes.

6. A device according to claim 4 wherein said reference means comprises an adjustable potentiometer, and wherein said additional means comprises an electronic comparator, said comparator being effective for producing said second output signal.

7. A device according to claim 4 wherein said transducer comprises spaced electrodes normally having an infinitely large electrical resistance between said electrodes and exhibiting a plurality of finite electrical resistances between said electrodes depending on the electrical conductivity properties of said formation when said spaced electrodes experience a bridging of said formation across said spaced electrodes, wherein said reference means comprises an adjustable potentiometer, and wherein said additional means comprises an electronic comparator, said comparator being effective for producing said second output signal.

8. A device according to claim 1 wherein said first means comprises first temperature sensing means adapted to sense the temperature of said surface and create in accordance therewith a first parameter output signal, temperature reference means adapted to create a first reference signal of a predetermined magnitude indicative of a predetermined temperature, first additional means for receiving said first parameter output signal and said first reference signal, said first additional means being effective upon receiving said first parameter output signal and said first reference signal for determining if said temperature of said surface is equal to or less than said predetermined temperature, wherein said second means comprises transducer means responsive to the presence of said formation and thereupon effective for creating a second parameter output signal, second reference means effective for creating a second parameter output signal, second reference means effective for creating a second reference signal of a predetermined magnitude, and second additional means for receiving said second parameter output signal and said second reference signal, said second additional means being effective upon receiving said second parameter output signal and said second reference signal for determining if said second parameter output signal is equal to or greater than said predetermined magnitude of said second reference signal.

9. A device according to claim 8 wherein said first temperature sensing means comprises a thermistor, wherein said temperature reference means comprises an adjustable potentiometer, wherein said first additional means comprises an electronic comparator effective for producing said first output signal, wherein said transducer means comprises spaced electrodes normally exhibiting the characteristic of an infinitely large electrical resistance between said electrodes and at other times exhibiting any of a plurality of finite values of electrical resistance between said electrodes depending on the electrical conductivity properties of said formation when said spaced electrodes experience a bridging of said formation across said spaced electrodes, wherein said second reference means comprises an adjustable potentiometer, and wherein said second additional means comprises an electronic comparator effective for producing said second output signal.

10. A device according to claim 1 wherein said third means comprises transducer means responsive to the presence of said formation and effective for producing a first parameter signal indicative of said formation being free water and a second parameter signal indicative of said formation being frost, snow or ice, first reference means for creating a first reference signal of a predetermined magnitude equivalent to said second parameter signal, first additional means for receiving either of said first or second parameter signals and said first reference signal, said first additional means being effective upon simultaneously receiving said second parameter signal and said first reference signal to energize associated heating means for heating said transducer to a second predetermined temperature above freezing temperature, said transducer being effective upon being heated to above freezing temperature to melt said formation of frost, ice or snow thereby forming free water and in response thereto create said first parameter signal, second reference means for creating a second reference signal of a predetermined magnitude equivalent to said first parameter signal, second additional means for receiving either of said first or second parameter signals and said second reference signal, said second additional means being effective upon simultaneously receiving said first parameter signal and said second reference signal to produce said third output signal.

11. A device according to claim 10 including temperature responsive control means for regulating the temperature of said transducer is heated by said associated heating means.